United States Patent [19]
Stoiber et al.

[11] Patent Number: 5,952,742
[45] Date of Patent: Sep. 14, 1999

[54] SYNCHRONOUS LINEAR MOTOR WITH IMPROVED MEANS FOR POSITIONING AND FASTENING PERMANENT MAGNETS

[75] Inventors: Dietmar Stoiber, Grünwald, Germany; Peter Rosner, Munich, Germany

[73] Assignees: Krauss-Maffei AG; InTraSys GmbH, both of Munich, Germany

[21] Appl. No.: 08/722,028

[22] PCT Filed: Jan. 17, 1996

[86] PCT No.: PCT/EP96/00172

§ 371 Date: Oct. 2, 1996

§ 102(e) Date: Oct. 2, 1996

[87] PCT Pub. No.: WO96/24189

PCT Pub. Date: Aug. 8, 1996

[30] Foreign Application Priority Data

Feb. 3, 1995 [DE] Germany .......................... 195 03 511

[51] Int. Cl.[6] .......................... H02K 41/02; H02K 1/17; H02K 1/18
[52] U.S. Cl. .................. 310/12; 310/86; 310/156
[58] Field of Search .................. 310/12, 13, 86, 310/156, 218, 154; 318/135; 29/607; 335/303, 306; 104/286

[56] References Cited

U.S. PATENT DOCUMENTS

| | | | |
|---|---|---|---|
| 2,463,936 | 3/1949 | Allison | 172/36 |
| 3,518,593 | 6/1970 | Hall | 335/285 |
| 3,828,212 | 8/1974 | Harkness et al. | 310/12 |
| 4,587,450 | 5/1986 | Ozaki | 310/156 |
| 4,803,387 | 2/1989 | Seider | 310/12 |
| 4,859,974 | 8/1989 | Kliman et al. | 310/86 |
| 5,450,050 | 9/1995 | Ban et al. | 335/306 |

FOREIGN PATENT DOCUMENTS

| | | |
|---|---|---|
| A 2 279 246 | 2/1976 | France . |
| A 2 691 592 | 11/1993 | France . |
| A 43 02 807 | 8/1994 | Germany . |
| 5-49299 | 2/1993 | Japan .......... 310/89 |
| 5-211760 | 8/1993 | Japan .......... 310/89 |
| WO A 93 01646 | 1/1993 | WIPO . |

*Primary Examiner*—Nestor Ramirez
*Assistant Examiner*—K. Eizo Tamai
*Attorney, Agent, or Firm*—Henry M. Feiereisen

[57] ABSTRACT

A synchronous linear motor with primary part having a winding and a secondary part including an elongated bearing plate to which the pre-magnetized permanent magnets of brittle and corrosion-prone material, are firmly adhesively secured while maintaining the pole pitch grid. In order to be able to securely bond the pre-magnetized permanent magnets to the secondary part economically and with high precision, it is proposed that spacers (2,3) corresponding to the pole pitch grid of the synchronous linear motor be arranged between pre-magnetized permanent magnets (4).

7 Claims, 2 Drawing Sheets

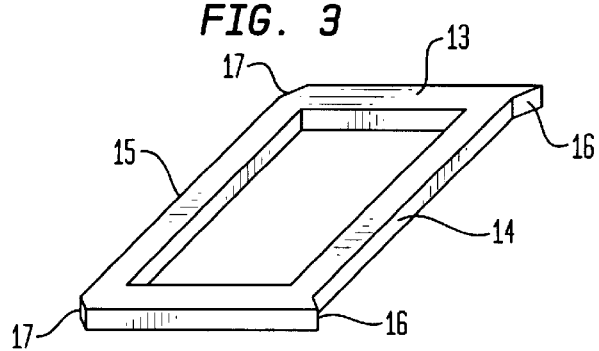
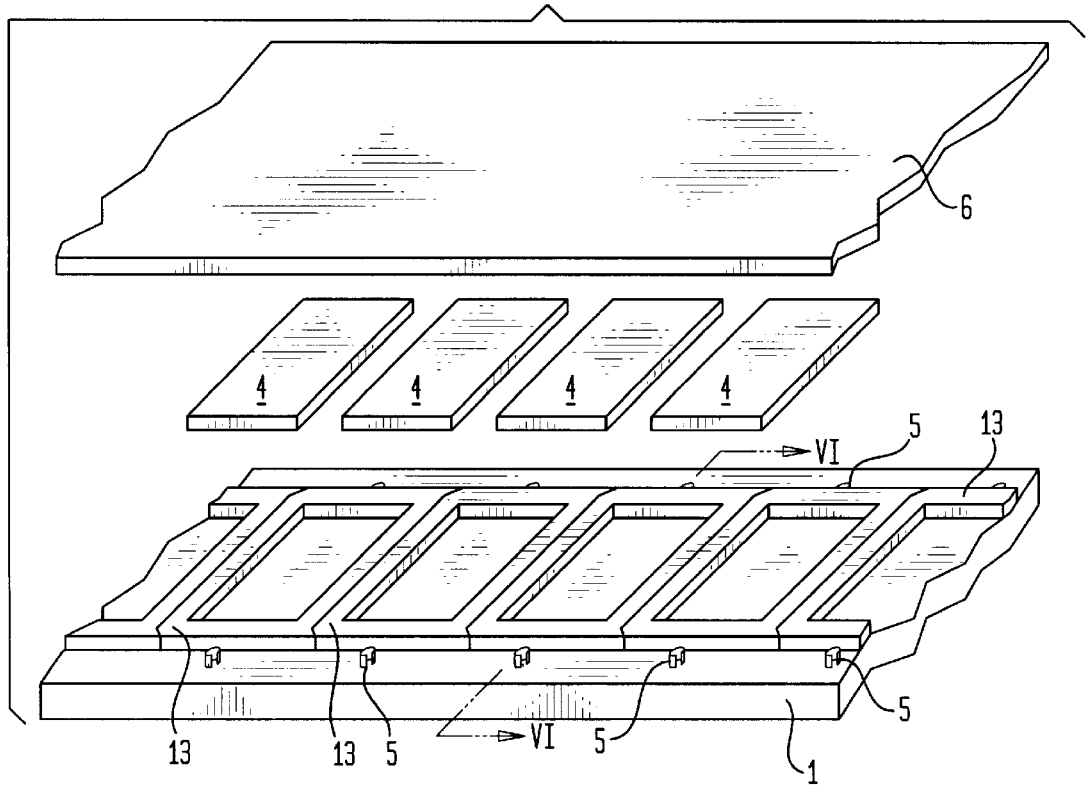
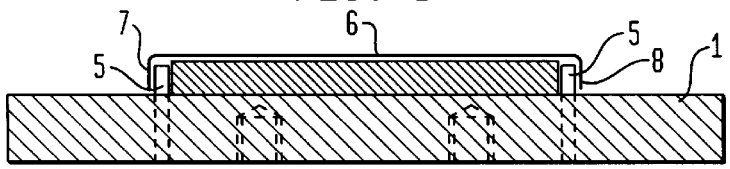
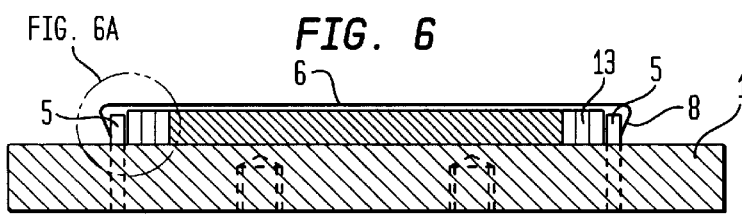
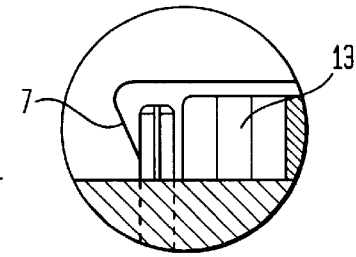

5,952,742

SYNCHRONOUS LINEAR MOTOR WITH IMPROVED MEANS FOR POSITIONING AND FASTENING PERMANENT MAGNETS

BACKGROUND OF THE INVENTION

The invention relates to a synchronous linear motor with a primary part provided with a winding and a secondary part including an elongated ferromagnetic support plate for bonded attachment of permanent magnets defining a parallel gap therebetween.

There exists a problem with synchronous linear motors of this type in that the permanent magnets which have to be arranged in alternating north-south polarity, shift during the bonding process as a result of the mutually effecting magnetic forces and cannot be secured at the intended locations. In order to obviate these drawbacks, the magnets are usually affixed to the support plate in their non-magnetized state and are magnetized only after they have been mounted. However, a magnetizing device required for magnetizing the affixed magnets is very complicated.

SUMMARY OF THE INVENTION

It is therefore an object of the invention to attach completely magnetized permanent magnets to the secondary part and the support plate in a simple and highly precise manner.

This object of the invention is achieved in that spacers which correspond to the pole pitch of the synchronous linear motor are arranged between the permanent magnets.

The spacers may be formed by a pair of spacer pins arranged in side-by-ide relationship on the support plate. Since the permanent magnets, which are manufactured by a sintering process, are very brittle, it may be advantageous to substitute the spacer pins, which essentially exert a point load, with crossbars upon which the permanent magnets bear against along their entire length.

In the same fashion, the permanent magnets can be positioned via lateral positioning pins or positioning strips extending along their sides.

In a preferred embodiment, the crossbars and the lateral positioning strips can be united to a single-piece, ladder-like positioning structure.

In accordance with a suitable embodiment of the invention, the spacers are made by individual frames which surround one or more permanent magnets. These individual frames are preferably provided with centering devices, for example centering wedge-shaped protrusions and recesses so that as a result of the attractive force between pairs of neighboring permanent magnets, the individual frames are pressed together in a self-centering fashion and are thus in their entirety joined together in an exactly lined-up and stable ladder structure. When the individual frames are manufactured from injection molded plastic parts, the resulting building blocks are inexpensive and have the desired non-magnetic properties.

Since, on the one hand, the permanent magnets are made of very brittle and corrodible material and, on the other hand, they are covered by the primary part only to a small extent, it is necessary to protect the open regions of the permanent magnets. For this purpose, it is advantageous to protect the permanent magnets with a cover plate formed with lateral folds which surround the permanent magnets directly at their lateral faces or surround the lateral positioning elements thereof, e.g. the lateral strips, the lateral positioning pins or the individual frames. The cover plate is connected to the secondary part as a result of the spring action of the folds and forms a reliable protection against detrimental mechanical and corrosive conditions.

Exemplified embodiments of the invention will be described hereinafter with reference to the drawing, in which:

BRIEF DESCRIPTION OF THE DRAWING

FIG. 3 is an illustration of an individual frame, FIG. 4 is an illustration of several individual frames affixed to the support plate of the secondary part, FIG. 5 is a cross sectional view of a secondary part with cover plate according to FIG. 1, and FIG. 6 is a cross sectional view of a secondary part according to FIG.4.

DETAILED DESCRIPTION OF PREFERRED EMBODIMENTS

Figure 1:
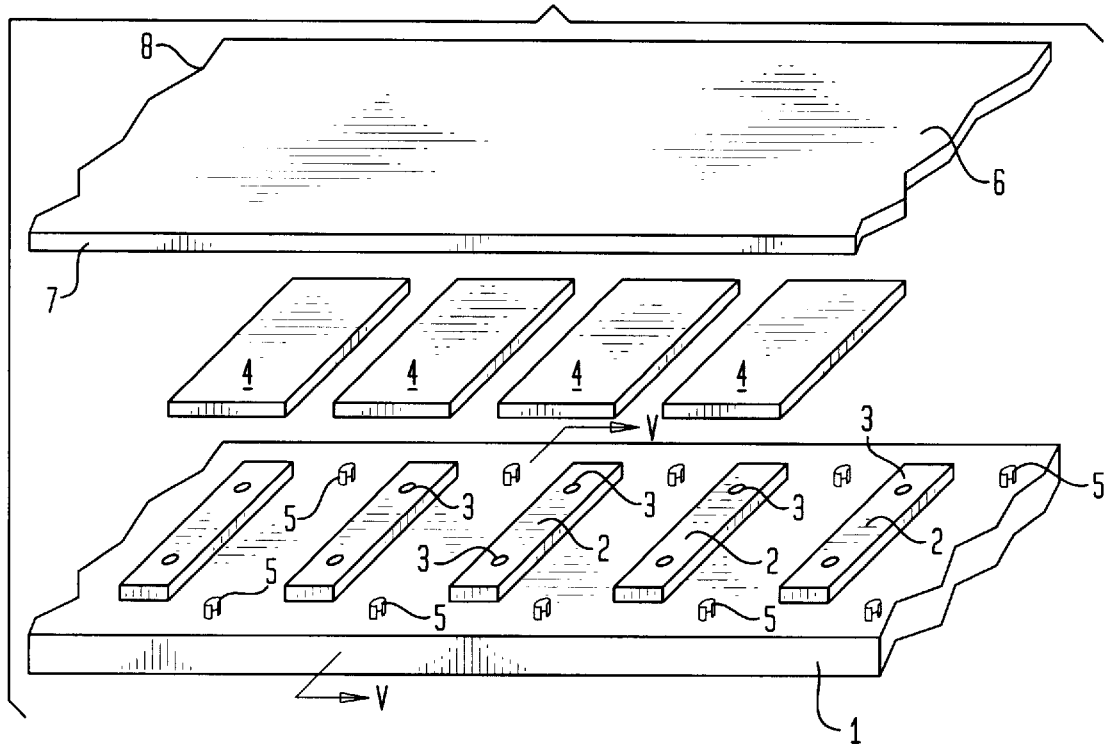
FIG. 1 is a perspective view of the components of a secondary part.

FIG. 1 shows the support plate 1 of the secondary part of a synchronous linear motor with crossbars 2 made from non-magnetic material. The crossbars 2 are secured with pins 3. In another not shown embodiment, the pins 3 can function as spacers for the permanent magnets in lieu of the crossbars 2. The crossbars 2 are arranged exactly according to the pole pitch grid of the synchronous linear motor. The permanent magnets 4 are placed between the crossbars 2 and bonded to the support plate. Lateral positioning pins 5 are arranged for lateral securement of the permanent magnets 4. After being bonded, the permanent magnets 4 are covered with a cover plate 6 of thin sheet metal which is formed on both sides with folds 7 and 8 which are spring-biased for secure clamping at both sides of the permanent magnets 4.

Figure 2:
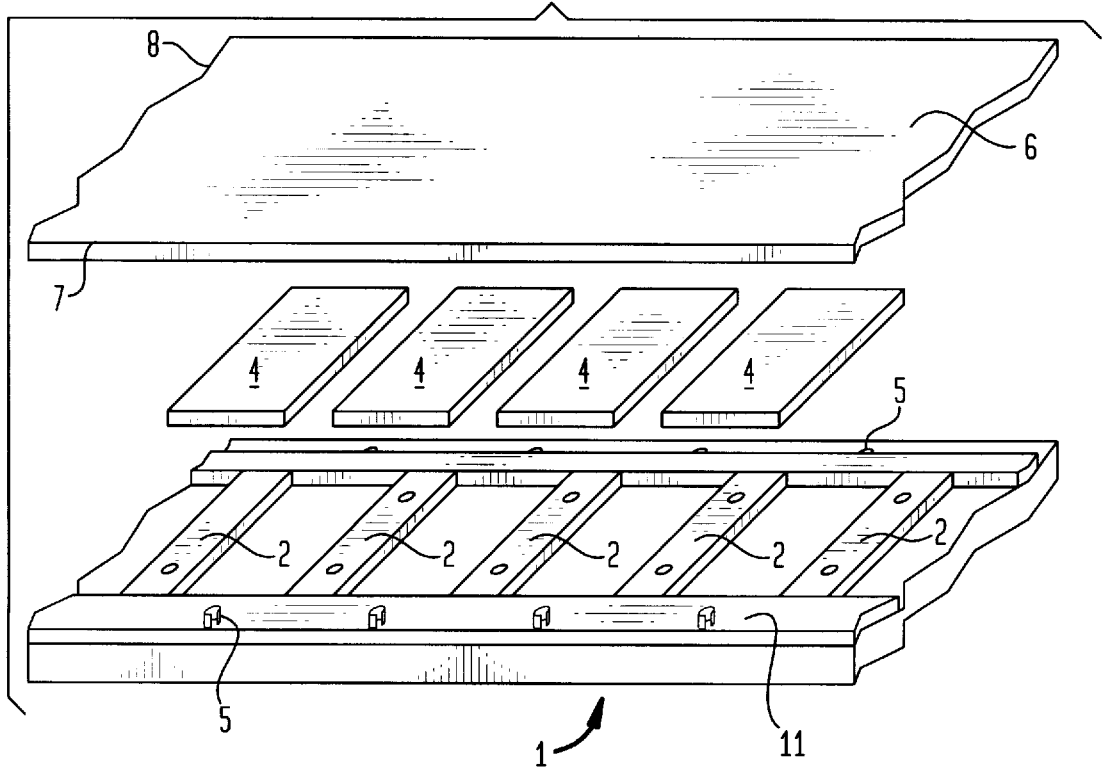
FIG. 2 shows the view of the secondary part according to FIG. 1 with lateral positioning strips.

The embodiment according to FIG. 2 corresponds to the embodiment according to FIG. 1; in addition, however, positioning strips 11 and 12 are arranged alongside the lateral positioning pins.

FIG. 3 shows an individual frame 13 as further exemplified embodiment of a spacer element. According to the illustration of FIG. 4, several of these individual frames 13 are united to a ladder-like support structure for the permanent magnets 4. Each individual frame 13 comprises centering devices which are made of wedge-shaped lugs 16 formed on the contacting sides 14 and 15 of the individual frames 13, and complementary wedge-shaped chamfers 17.

When the permanent magnets 4 are placed into the individual frames 13, the individual frames 13 are pressed together as a result of the mutually magnetic attractive force between the permanent magnets 4 and joined together and aligned by the centering devices to form a straight and stable support structure. The support structure ensures that the pole pitch grid is precisely observed when the permanent magnets 4 are bonded, and remains on the support plate as a lost template.

FIG. 5 shows a cross sectional view of a completely assembled secondary part according to FIG. 1, with permanent magnets 4 bonded to the support plate 1 and lateral positioning pins 5. The cover plate 6 laterally surrounds the permanent magnets 4 and is secured by the folds 7 and 8 which are spring-biased against the positioning pins 5.

FIG. 6 shows a cross sectional view of a completely assembled secondary part according to FIG. 4, with the individual frames 13 being also covered by the cover plate 6.

In the completely assembled state, the permanent magnets 4 made of very brittle and corrodible material, are, on the one hand, surrounded by the spacers serving as a lost template, and, on the other hand, surrounded by the cover plate 6 so that the fragile and corrodible permanent magnets 4 are protected by a complete encapsulation. Furthermore, the spacers ensure in a simple manner an observance of the pole pitch grid during bonding of the permanent magnets 4.

We claim:

1. A synchronous linear motor; comprising:

a primary part;

a secondary part including an elongated ferromagnetic support plate;

a plurality of permanent magnets adapted for attachment onto the support plate, said permanent magnets having opposite sides;

encapsulating means for securement of neighboring permanent magnets at an accurate spacing from one another by substantially enveloping each permanent magnet, said encapsulation means including spacers made of non-magnetic material and arranged on the support plate between neighboring permanent magnets, a cover plate secured at the opposite sides of the permanent magnets and covering the permanent magnets, and positioning pins spaced from one another along the opposite sides of the permanent magnets and extending from the support plate, wherein the cover plate is provided with lateral folds which flank the permanent magnets along the opposite sides of the permanent magnets and are resiliently pressed against the positioning pins; and positioning strips extending along the opposite sides of the permanent magnets in a substantially perpendicular disposition to the spacers, said positioning pins extending from the support plate against the side of the positioning strips for securement of the positioning strips on the support plate.

2. The synchronous linear motor of claim 1, wherein each of the spacers is formed by a pin secured between neighboring permanent magnets in the support plate.

3. The synchronous linear motor of claim 1, wherein each of the spacers is formed by a crossbar and a pin for securement of the crossbar on the support plate.

4. The synchronous linear motor of claim 1, wherein the spacers and the positioning strips form a single-piece frame.

5. The synchronous linear motor of claim 4, wherein the single-piece frame has formed therein centering means which engage one another to effect a centered and aligned configuration.

6. The synchronous linear motor of claim 5 wherein each frame has opposite contact sides, said centering means being formed by wedge-shaped lugs formed on the contact sides of each individual frame for engagement complementary wedge-shaped chamfers of a neighboring frame.

7. The synchronous linear motor of claim 4 wherein the frame is an injection molded plastic part.

* * * * *